(12) United States Patent  (10) Patent No.: US 11,994,434 B2
Fonk et al.  (45) Date of Patent: May 28, 2024

(54) TEMPERATURE INDICATOR

(71) Applicant: ShockWatch, Inc., Dallas, TX (US)

(72) Inventors: Anthony N. Fonk, Austin, TX (US); Johannes A. van Niekerk, Dallas, TX (US)

(73) Assignee: Shock Watch, Inc., Dallas, TX (US)

( * ) Notice: Subject to any disclaimer, the term of this patent is extended or adjusted under 35 U.S.C. 154(b) by 599 days.

(21) Appl. No.: 17/148,922

(22) Filed: Jan. 14, 2021

(65) Prior Publication Data

US 2021/0215551 A1 Jul. 15, 2021

Related U.S. Application Data

(60) Provisional application No. 62/960,840, filed on Jan. 14, 2020.

(51) Int. Cl.
G01K 7/38 (2006.01)
G01K 7/30 (2006.01)
H01Q 1/22 (2006.01)
G01K 5/46 (2006.01)

(52) U.S. Cl.
CPC ............. *G01K 7/38* (2013.01); *G01K 7/30* (2013.01); *H01Q 1/2208* (2013.01); *G01K 5/465* (2013.01)

(58) Field of Classification Search
CPC ........... G01K 1/024; G01K 3/04; G01K 11/06
USPC .................................................. 340/870.17
See application file for complete search history.

(56) References Cited

U.S. PATENT DOCUMENTS

| 3,230,358 | A | | 1/1966 | Davis et al. |
| 3,499,323 | A | | 3/1970 | Sturges |
| 3,706,952 | A | * | 12/1972 | Alley ............... H01H 37/60 337/13 |
| 3,961,323 | A | | 6/1976 | Hartkorn |
| 4,462,023 | A | | 7/1984 | Nielsen et al. |
| 4,496,829 | A | | 1/1985 | Black et al. |
| 4,575,803 | A | | 3/1986 | Moore |
| 4,604,871 | A | | 8/1986 | Chiu et al. |
| 4,621,502 | A | | 11/1986 | Ibrahim et al. |
| 4,685,061 | A | | 8/1987 | Whitaker |
| 4,750,197 | A | | 6/1988 | Denekamp et al. |
| 4,972,099 | A | | 11/1990 | Amanao et al. |
| 5,244,146 | A | | 9/1993 | Jefferson et al. |
| 5,254,992 | A | | 10/1993 | Keen et al. |
| 5,262,758 | A | | 11/1993 | Nam et al. |

(Continued)

FOREIGN PATENT DOCUMENTS

CN 106482845 A * 3/2017
DE 102006011737 A1 9/2007

(Continued)

OTHER PUBLICATIONS

17148922_2023-08-23_JP_H0650667_B2_H.pdf.*

(Continued)

*Primary Examiner* — Gail Kaplan Verbitsky
(74) *Attorney, Agent, or Firm* — Dority & Manning, P.A.

(57) ABSTRACT

A temperature indicator includes a housing having a temperature detection assembly, switch circuitry, and a radio-frequency identification (RFID) module coupled to the switch circuitry. Responsive to the temperature detection assembly being subjected to a temperature exceeding a threshold, the switch circuitry causes a change in a value output by the RFID module when activated.

20 Claims, 5 Drawing Sheets

(56) References Cited

U.S. PATENT DOCUMENTS

| | | | |
|---|---|---|---|
| 5,313,848 A | 5/1994 | Santin et al. |
| 5,403,093 A | 4/1995 | Flynn et al. |
| 5,424,720 A | 6/1995 | Kirkpatrick |
| 5,442,669 A | 8/1995 | Medin |
| 5,452,335 A | 9/1995 | Slater et al. |
| 5,528,228 A | 6/1996 | Wilk |
| 5,798,694 A | 8/1998 | Reber et al. |
| 5,835,012 A | 11/1998 | Wilk |
| 5,844,862 A | 12/1998 | Cocatre-Zilgien |
| 5,867,809 A | 2/1999 | Soga et al. |
| RE36,200 E | 4/1999 | Berrian et al. |
| 5,917,416 A | 6/1999 | Read |
| 5,936,523 A | 8/1999 | West |
| 6,034,607 A | 3/2000 | Vidaillac |
| 6,042,264 A | 3/2000 | Prusik et al. |
| 6,046,674 A | 4/2000 | Irwin et al. |
| 6,046,678 A | 4/2000 | Wilk |
| 6,185,513 B1 | 2/2001 | Plettner et al. |
| 6,275,779 B1 | 8/2001 | Ponie et al. |
| 6,286,992 B1 | 9/2001 | Kyrtsos |
| 6,320,512 B1 | 11/2001 | Nicholson et al. |
| 6,326,892 B1 | 12/2001 | De La Forterie |
| 6,411,916 B1 | 6/2002 | Pellerin |
| 6,424,930 B1 | 7/2002 | Wood |
| 6,438,502 B1 | 8/2002 | Awtrey et al. |
| 6,501,390 B1 | 12/2002 | Chainer et al. |
| 6,555,789 B2 | 4/2003 | Owens et al. |
| 6,570,508 B1 | 5/2003 | Kvenvold |
| 6,617,963 B1 * | 9/2003 | Watters ............... G01K 5/483 |
| | | 360/60 |
| 6,643,608 B1 | 11/2003 | Hershey et al. |
| 6,712,276 B1 | 3/2004 | Abali et al. |
| 6,753,830 B2 | 6/2004 | Gelbman |
| 6,771,177 B2 | 8/2004 | Alderman |
| 6,806,808 B1 | 10/2004 | Watters et al. |
| 6,811,305 B2 | 11/2004 | Laycock |
| 6,847,912 B2 | 1/2005 | Forster |
| 6,850,861 B1 | 2/2005 | Faiola et al. |
| 6,865,516 B1 | 3/2005 | Richardson |
| 6,889,165 B2 | 5/2005 | Lind et al. |
| 6,924,781 B1 | 8/2005 | Gelbman |
| 6,950,028 B2 | 9/2005 | Zweig |
| 6,970,100 B2 | 11/2005 | Lovegreen et al. |
| 6,985,408 B2 | 1/2006 | Quine |
| 7,004,621 B2 | 2/2006 | Roberts et al. |
| 7,057,495 B2 | 6/2006 | Debord et al. |
| 7,081,811 B2 | 7/2006 | Johnston et al. |
| 7,102,526 B2 | 9/2006 | Zweig |
| 7,140,768 B2 | 11/2006 | Prabhakar |
| 7,142,110 B2 | 11/2006 | Schmidtberg et al. |
| 7,165,015 B2 | 1/2007 | Roberts |
| 7,225,107 B2 | 5/2007 | Buxton et al. |
| 7,250,858 B2 | 7/2007 | Schmidtberg et al. |
| 7,253,731 B2 | 8/2007 | Joao |
| 7,378,954 B2 | 5/2008 | Wendt |
| 7,409,310 B1 | 8/2008 | Wade |
| 7,417,417 B2 | 8/2008 | Williams et al. |
| 7,455,225 B1 | 11/2008 | Hadfield et al. |
| 7,482,920 B2 | 1/2009 | Joao |
| 7,487,037 B2 | 2/2009 | Schmidtberg |
| 7,495,400 B2 | 2/2009 | Testin |
| 7,552,029 B2 | 6/2009 | Elwood et al. |
| 7,680,622 B2 | 3/2010 | Dupuy et al. |
| 7,857,996 B2 * | 12/2010 | Gordon ............... G01K 3/005 |
| | | 430/617 |
| 8,154,417 B2 | 4/2012 | Hauenstein et al. |
| 8,199,020 B1 * | 6/2012 | Kim ..................... G01K 1/024 |
| | | 340/572.1 |
| 8,665,575 B2 * | 3/2014 | Clevenger ............ H02H 7/20 |
| | | 361/103 |
| 10,345,159 B1 | 7/2019 | Yeager et al. |
| 10,810,578 B2 * | 10/2020 | Colby ............ G06K 19/07327 |
| 2004/0113783 A1 | 6/2004 | Yagesh |
| 2005/0012616 A1 * | 1/2005 | Forster ................ G06K 19/073 |
| | | 340/572.7 |
| 2005/0157774 A1 | 7/2005 | DiLuiso et al. |
| 2005/0270709 A1 | 12/2005 | Piemmons et al. |
| 2007/0008119 A1 | 1/2007 | Pohle et al. |
| 2007/0056369 A1 | 3/2007 | Griffin et al. |
| 2007/0085062 A1 * | 4/2007 | Gordon ............... G01K 3/005 |
| | | 374/E11.006 |
| 2007/0243621 A1 | 10/2007 | Zweig |
| 2008/0052044 A1 | 2/2008 | Shoenfeld |
| 2008/0082043 A1 | 4/2008 | Janssen |
| 2008/0120188 A1 | 5/2008 | Mobley et al. |
| 2008/0144697 A1 | 6/2008 | Stewart et al. |
| 2010/0244574 A1 | 9/2010 | Nishino et al. |
| 2016/0290871 A1 | 10/2016 | Kozono et al. |
| 2016/0364642 A1 * | 12/2016 | Viala ................... G06K 7/10346 |
| 2019/0236425 A1 | 8/2019 | Fonk et al. |

FOREIGN PATENT DOCUMENTS

| | | | | |
|---|---|---|---|---|
| JP | S6344926 B2 * | 9/1988 | | |
| JP | H0650667 B2 * | 6/1994 | | |
| JP | 3812443 B2 * | 8/2006 | | |
| JP | 2011216221 | 10/2011 | | |
| WO | 9909637 | 2/1999 | | |
| WO | 9935453 | 7/1999 | | |
| WO | 0150103 | 7/2001 | | |
| WO | WO-2004083798 A1 * | 9/2004 | ............ | G01K 1/024 |
| WO | 2006048412 | 5/2006 | | |
| WO | WO-2013051121 A1 * | 4/2013 | ......... | G06K 19/0715 |

OTHER PUBLICATIONS

17148922_2023-08-23_JP_S6344926_B2_H.pdf.*
17148922_2023-08-23_CN_106482845_A_H.pdf.*
17148922_2023-08-23_WO_2004083798_A1_H.pdf.*
17148922_2023-08-23_CN_106482845_A_H.pdf,Mar. 8, 2017.*
17148922_2023-08-23_JP_3812443_B2_H.pdf,Aug. 23, 2006.*
17148922_2023-08-23_WO_2004083798_A1_H.pdf,Sep. 30, 2004.*
17148922_2023-08-23_JP_H0650667_B2_H.pdf,Jun. 29, 1994.*
17148922_2024-01-09_WO_2013051121_A1_H.pdf,Apr. 11, 2013.*
International Search Report and Written Opinion; PCT Application No. PCT/US2021/013445; dated May 18, 2021.
European Search Report Corresponding to EP21741823 on Jan. 29, 2024.

* cited by examiner

TEMPERATURE INDICATOR

BACKGROUND

During manufacturing, storage, transit, or usage, many types of objects need to be monitored or tracked due to the temperature sensitivity or fragility of the objects. For example, some types of objects may be susceptible to damage if exposed to certain temperatures, must be maintained above or below a certain temperature, or must be exposed to a certain temperature for certain purposes (e.g., medical products needing to be sterilized, food products, and pharmaceutical items). Thus, for quality control purposes and/or the general monitoring of transportation conditions, it is desirable to determine and/or verify the environmental conditions to which the object has been exposed.

BRIEF SUMMARY

According to one embodiment of the present disclosure, a temperature indicator includes a housing having a temperature detection assembly, switch circuitry, and a radio-frequency identification (RFID) module coupled to the switch circuitry. Responsive to the temperature detection assembly being subjected to a temperature exceeding a threshold, the switch circuitry causes a change in a value output by the RFID module when activated.

According to another embodiment of the present disclosure, a temperature indicator includes a housing having a support member containing a non-conductive malleable substance, a communication module, and switch circuitry including a switch element having at least a portion thereof disposed within the malleable substance and spaced apart from a conductive element. Responsive to the temperature indicator being subjected to a temperature exceeding a threshold, the portion moves within the malleable substance and into contact with the conductive element. The communication module is configured to indicate an activated state of the temperature indicator in response to the portion contacting the conductive element.

According to yet another embodiment of the present disclosure, a temperature indicator includes a housing having a temperature detection assembly, an arming element configured to maintain the temperature detection assembly in an unarmed state, switch circuitry, and a radio-frequency identification (RFID) module coupled to the switch circuitry. Removal of the arming element from the temperature indicator places the temperature detection assembly in an armed state. Responsive to the temperature detection assembly being subjected to a temperature exceeding a threshold after being in the armed state, the switch circuitry causes a change in a value output by the RFID module when activated.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a device and technique for temperature detection and indication. According to one embodiment, a temperature indicator includes a housing having a support member containing a non-conductive malleable substance, a communication module, and switch circuitry including a switch element having at least a portion thereof disposed within the malleable substance and spaced apart from a conductive element. Responsive to the temperature indicator being subjected to a temperature exceeding a threshold, the portion moves within the malleable substance and into contact with the conductive element. The communication module is configured to indicate an activated state of the temperature indicator in response to the portion contacting the conductive element. Some embodiments of the present disclosure enable temperature event detection using no internal power supply. For example, a temperature-sensing assembly or mechanism changes a state of switch circuitry (e.g., changing from an open circuit state to a closed circuit state) in response to detecting a particular temperature event. The RFID module can detect the state of the switch circuitry and emit or output a particular value based on whether the switch circuitry is in a closed or open condition. Thus, for example, an RFID reader can be used to activate the RFID module and determine an activation status of the temperature indicator device. Embodiments of the present disclosure provide a temperature indicator that is readily affixable to a container, an item or the like so as to provide at least an indication when a particular container or component has been subjected to a particular environmental temperature. Embodiments of the present disclosure also provide a temperature indicator that is an irreversible, "go-no go" device for indicating that a predetermined temperature has been experienced by the indicator.

Figure 1:
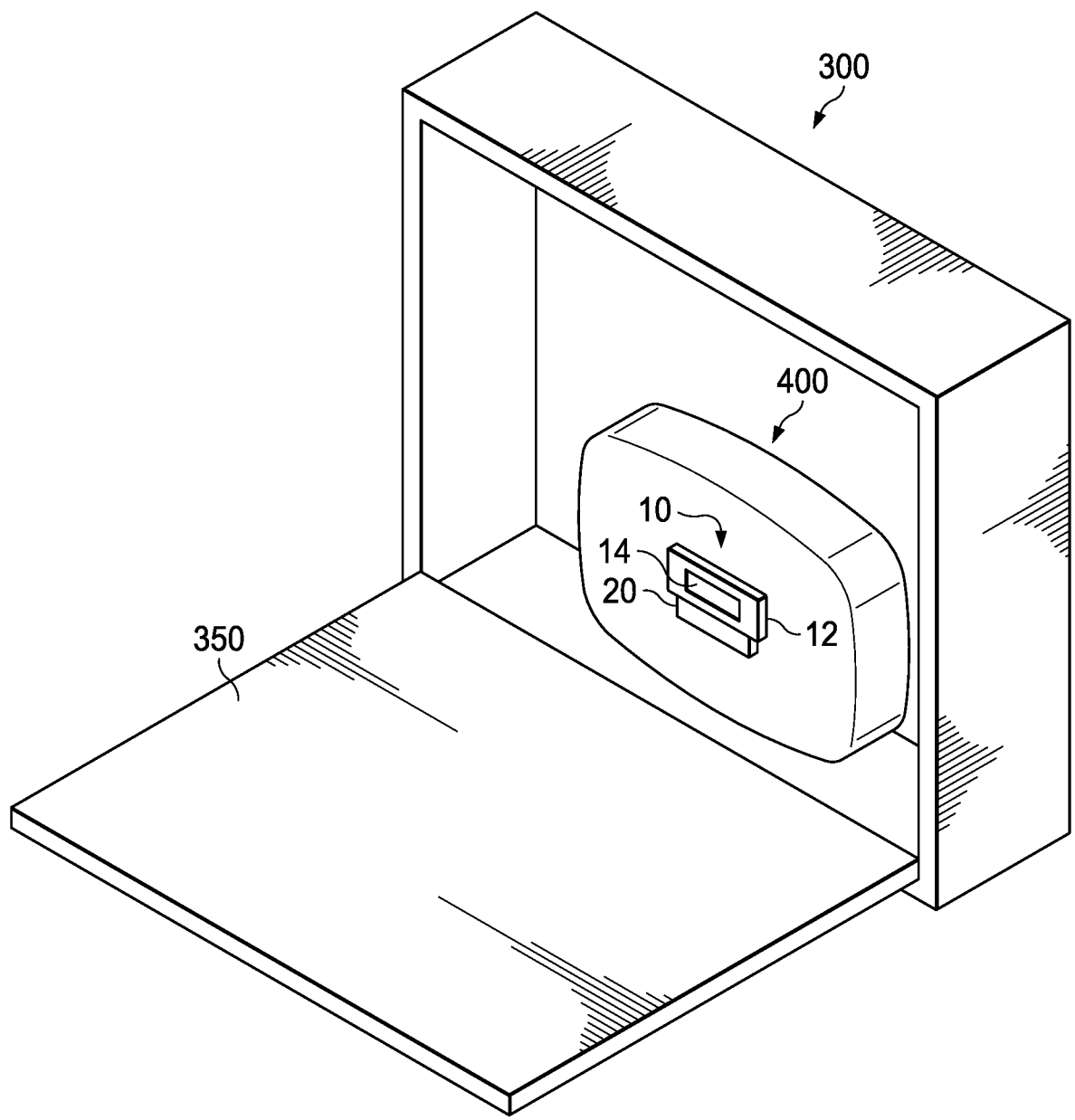
FIG. 1 is a diagram illustrating an application of an embodiment of a temperature indicator according to the present disclosure.

With reference now to the Figures and in particular with reference to FIG. 1, exemplary diagrams of a temperature indicator according to the present disclosure is depicted being used in a sterilization process. For example, in order to sterilize medical devices and certain industrial devices, sterilization chambers and sterilization pouches can be used. Examples of sterilization processes include steam heat, non-steam heat, ethylene oxide and hydrogen peroxide. In some of these sterilization processes, sterilization indicators are attached to a container/pouch or item to assure that the sterilization chamber is effective (i.e., reaches a desired temperature). FIG. 1 depicts a sterilization chamber 300 with a door 350 open so that it is possible to see a sterilization pouch 400 sitting inside of chamber 300. Sterilization chamber 300 in FIG. 1 is a temperature dependent chamber so sterilization pouch 400 has a temperature indicator 10 according to the present disclosure to assure that chamber 300 is efficacious. Temperature indicator 10 can also be used in a variety of different end uses in addition to sterilization (e.g. vaccine monitoring, food monitoring, and monitoring of other temperature sensitive products when in production, storage, or transit). Temperature indicator 10 in some embodiments may be a passive radio-frequency identification (RFID) enabled indicator capable of being read by an RFID reader. In some embodiments, another temperature indicator 20 may be used in connection with the chamber 300 that is visually readable due to a color change. An example of a visually readable temperature indicator 20 is the WarmMark® product from SpotSee of Dallas, Tex.

In the embodiment illustrated in FIG. 1, indicator 10 is a portable device configured to be affixed to or disposed to sterilization pouch 400 (or any other item or package where temperature monitoring is desirable). Sterilization pouch 400 contains an object for which temperature events associated therewith are to be monitored in order to determine the efficacy of a sterilization process. Embodiments of temperature indicator 10 according to the present disclosure monitor whether the object has been exposed to a particular temperature or environment during manufacturing, storage, and/or transport of the object. In some embodiments, temperature indicator 10 may be affixed to a transport container, pouch or the item itself using, for example, adhesive materials, permanent or temporary fasteners, or a variety of different types of attachment devices. The transport container/pouch may include a container in which a monitored object is loosely placed or may comprise a container of the monitored object itself. It should be appreciated that FIG. 1 is only exemplary and is not intended to assert or imply any limitation with regard to the environments in which different embodiments may be implemented.

In the embodiment illustrated in FIG. 1, temperature indicator 10 comprises a housing 12 having a temperature sensing, temperature-sensitive, and/or temperature detection assembly 14 disposed therein. In the illustrated embodiment, detection assembly 14 is configured to detect and respond to temperature events relative to indicator 10 (e.g., detecting when indicator 10 (and correspondingly, a container to which indicator 10 is associated with) has been subjected to a particular environmental temperature or temperature event).

Figure 2:
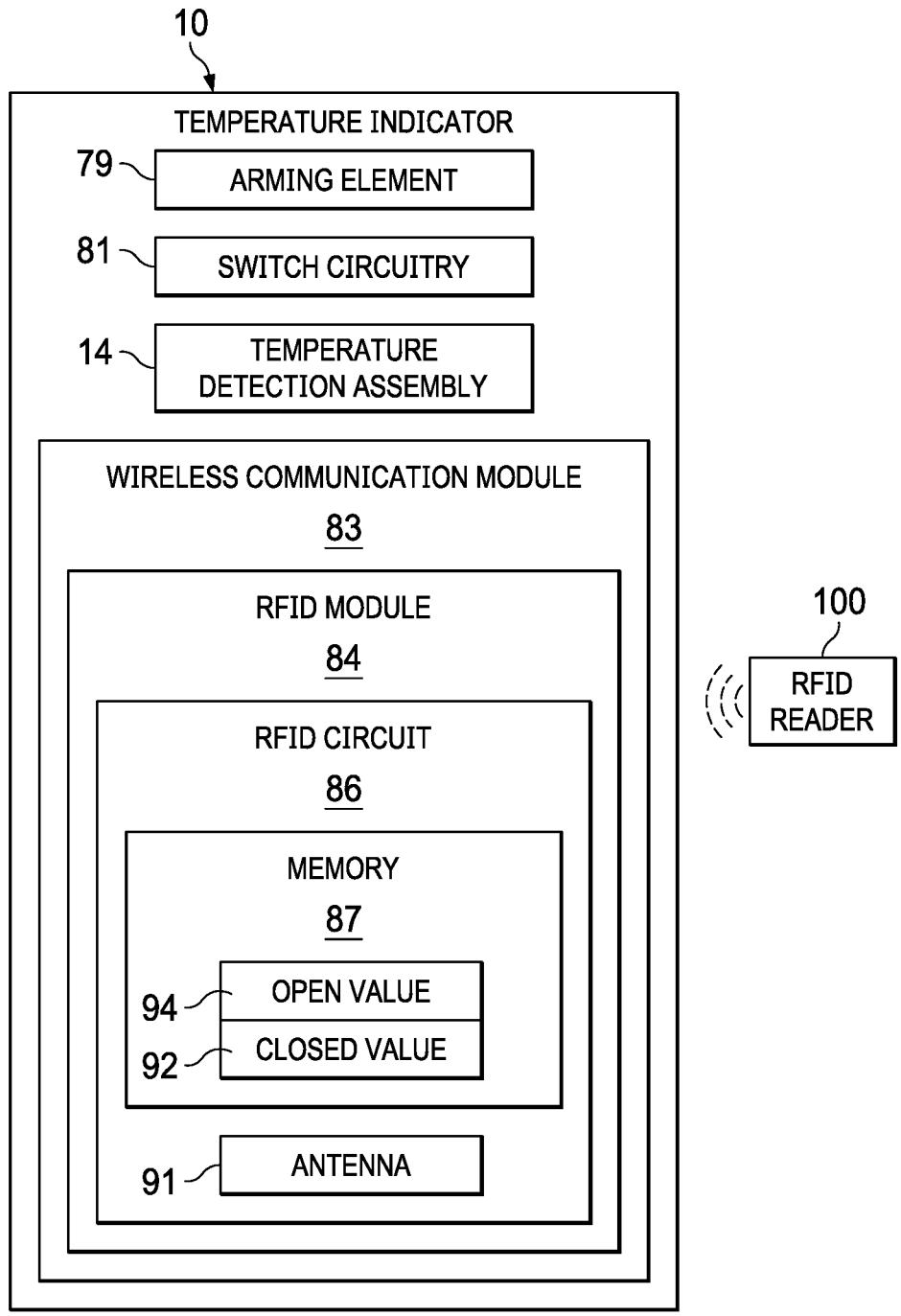
FIG. 2 is a block diagram illustrating an embodiment of a temperature indicator according to the present disclosure.

FIG. 2 is a block diagram representing and illustrating an embodiment of indicator 10 in accordance with the present disclosure. In some embodiments, temperature indicator 10 may be part of and/or affixed (permanently or removably) to a printed circuit board and/or otherwise permanently or removably connected to electronic circuitry (e.g., such as a removable cartridge) such that, in response to receipt and/or detection of a temperature condition of a sufficient magnitude and/or exceeding a particular threshold(s), temperature indicator 10 provides an electronic switch closure or opener that may thereby provide an electronic signal/indication of such temperature event.

In FIG. 2, indicator 10 includes an arming element 79, switch circuitry 81, a wireless communication module 83 coupled to switch circuitry 81, and temperature detection assembly 14 coupled to switch circuitry 81. Arming element 79 is configured to maintain indicator 10 in an unarmed state until it is desired to place indicator 10 in an armed state. For example, in an unarmed state, indicator 10 is configured to be maintained in an unactivated state even though indicator 10 may experience a temperature event exceeding a threshold. Accordingly, in an armed state, indicator 10 is configured to be responsive to a temperature event exceeding a threshold to provide an indication that the temperature event was experienced. Switch circuitry 81 may comprise one or more switch elements, contacts, and or circuits that are configured to be responsive to a change in temperature detection assembly 14. Wireless communication module 83 is configured to wirelessly communicate information associated with a state of switch circuitry 81 indicating the activation state of indicator 10 (e.g., based on an open or closed circuit state of circuitry 81). For example, in one embodiment, wireless communications module 83 includes an RFID module 84. In some embodiments, RFID module 84 comprises a passive RFID module 84 (e.g., a passive RFID tag) having an RFID integrated circuit or circuitry 86 (e.g., disposed on or as part of a printed circuit board) and a memory 87, along with an antenna 91. As a passive RFID module 84, indicator 10 does not contain a battery (e.g., power is supplied by an RFID reader 100). For example, when radio waves from reader 100 are encountered by module 84, antenna 91 forms a magnetic field, thereby providing power to module 84 to energize circuit 86. Once energized/activated, module 84 may output/transmit information encoded in memory 87. However, it should be understood that, in some embodiments, RFID module 84 may comprise an active RFID module 84 including a power source (e.g., a battery) that may be configured to continuously, intermittently, and/or according to programmed or event triggers, broadcast or transmit certain information. It should also be understood that wireless communication module 83 may be configured for other types of wireless communication types, modes, protocols, and/or formats (e.g., short-message services (SMS), wireless data using General Packet Radio Service (GPRS)/3G/4G or through public internet via Wi-Fi, or locally with other radio-communication protocol standards such as Wi-Fi, Z-Wave, ZigBee, Bluetooth®, Bluetooth® low energy (BLE), LoRA, NB-IoT, SigFox, Digital Enhanced Cordless Telecommunications (DECT), or other prevalent technologies). As will be described further below, temperature indicator 10 functions as a temperature fuse such that, in response to encountering a particular temperature (e.g., some temperature exceeding some threshold), an electrically conductive member either opens or closes an electronic switch (e.g., switch circuitry 81). This configuration enables temperature indicator 10 to be used as a passive temperature sensor/indicator that can be used as part of an electronic signal or circuit. In some embodiments, the temperature sensing capabilities/functions of temperature indicator 10 of the present disclosure need no power while in the monitoring state. When activated, temperature indicator 10 completes or opens an electrical path of a circuit and thus could be integrated into most any electronic monitoring system.

In the illustrated embodiment, memory 87 includes at least two different stored and/or encoded values 92 and 94. For example, value 92 may correspond to a value outputted/transmitted by module 84 when switch circuitry 81 is in an open circuit condition or state, and value 94 may correspond to a value outputted/transmitted by module 84 when switch circuitry 81 is in a closed circuit condition or state. As an example, the value 94 may represent an RFID tag identification (ID) number not having an activated temperature switch circuitry 81, and the RFID tag's ID number may have an additional character (e.g., "0") placed at the end thereof. Value 92 may represent the RFID ID number having an activated temperature switch circuitry 81, and the RFID tag's ID number may have an additional character at the end thereof being different from the additional character carried by value 94 (e.g., "1"). In the illustrated embodiment, RFID module 84 (e.g., circuitry 86) is coupled to switch circuitry 81 and can detect whether switch circuitry 81 is in an open or closed circuit condition or state. Thus, for example, switch circuitry 81 may initially be in an open circuit condition or state. Thus, if energized/activated by reader 100, module 84 would transmit value 94 to reader 100. If indicator 10 were to be subject to a temperature event (e.g., an environmental temperature exceeding some threshold), temperature detection assembly 14 may cause a change in circuitry 81 that would result in circuitry 81 being in an closed circuit condition or state. Thus, if now energized/activated by reader 100 (e.g., after the temperature event), module 84 would instead transmit value 92 to reader 100. Thus, embodiments of the present invention enable indicator 10 to monitor sensitive products/objects to which it is attached for potential damage caused by temperature conditions using electronic indicators (e.g., RFID readers) while indicator 10 does not contain or require any internal power source (e.g., a battery).

The present invention may include computer program instructions at any possible technical detail level of integration (e.g., stored in a computer readable storage medium (or media) (e.g., memory 87) for causing a processor to carry out aspects of the present invention. Computer readable program instructions described herein can be downloaded to respective computing/processing devices (e.g., communications module 83 and/or RFID module 84). Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. In some embodiments, electronic circuitry (e.g., circuitry 86) including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to illustrations and/or block diagrams of methods and/or apparatus according to embodiments of the invention. It will be understood that each block of the illustrations and/or block diagrams, and combinations of blocks in the illustrations and/or block diagrams, may represent a module, segment, or portion of code, can be implemented by computer readable program instructions. These computer readable program instructions may be provided to a processor or other programmable data processing apparatus to produce a machine, such that the instructions, which execute via the processor, create means for implementing the functions/acts specified in the illustrations and/or block diagram block or blocks. These computer readable program instructions may also be stored in a computer readable storage medium that can direct a computing device, a programmable data processing apparatus, and/or other devices to function in a particular manner, such that the computer readable storage medium having instructions stored therein comprises an article of manufacture including instructions which implement aspects of the function/act specified in the illustrations and/or block diagram block or blocks. Switch circuitry 81, wireless communications module 83, and/or RFID module 84 may be implemented in any suitable manner using known techniques that may be hardware-based, software-based, or some combination of both. For example, switch circuitry 81, wireless communication module 83, and/or RFID module 84 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). As will be appreciated by one skilled in the art, aspects of the present disclosure may be embodied as a system, method or computer program product. Accordingly, aspects of the present disclosure may take the form of a hardware embodiment, a software embodiment (including firmware, resident software, microcode, etc.) or an embodiment combining software and hardware aspects that may all generally be referred to herein as a "circuit," "module" or "system."

Figure 3A:
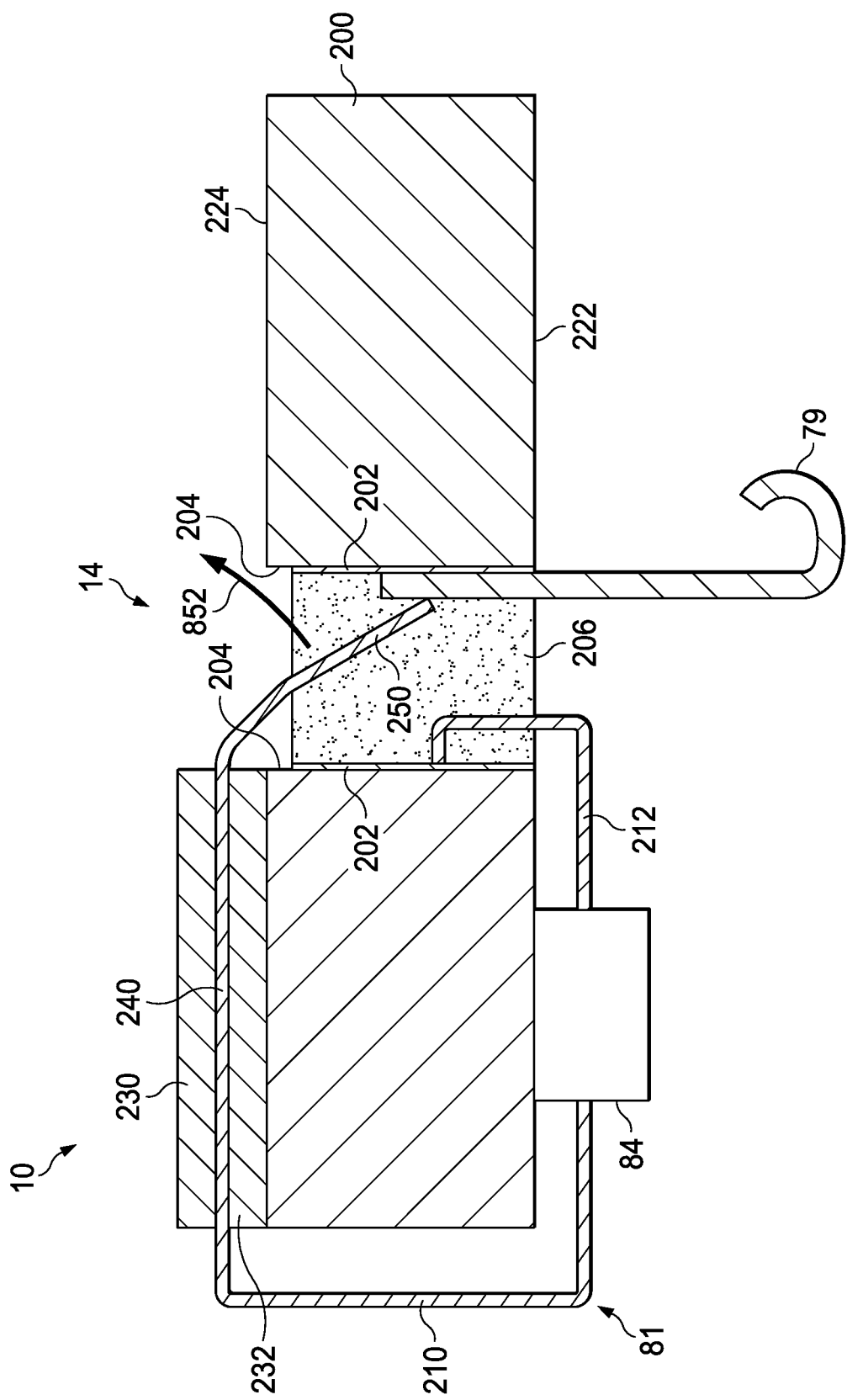
FIG. 3A is a diagram illustrating an embodiment of a temperature indicator in accordance with the present disclosure in an unactivated state.
Figure 3B:
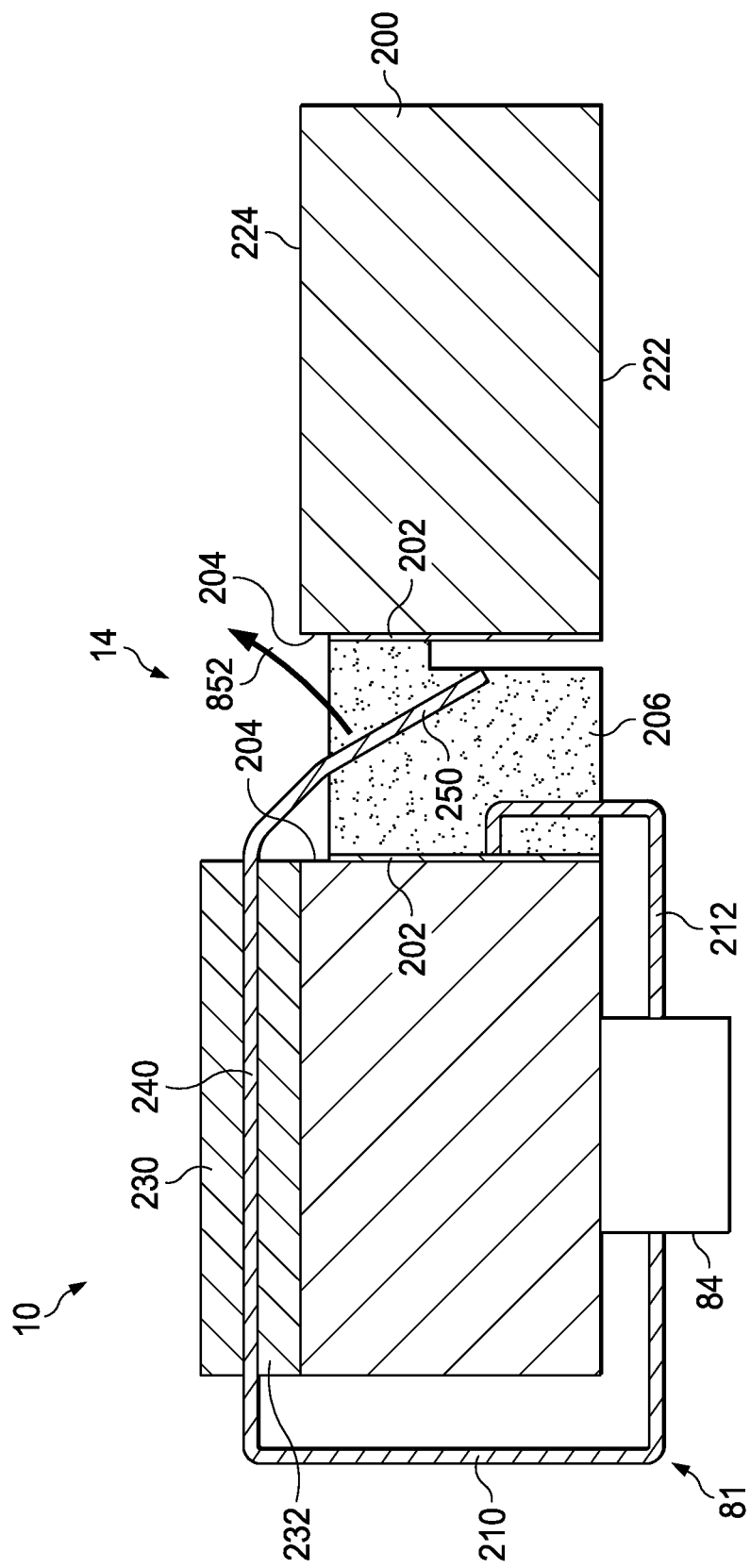
FIG. 3B is a diagram illustrating the temperature indicator of FIG. 3A in accordance with the present disclosure in an armed and unactivated state.
Figure 3C:
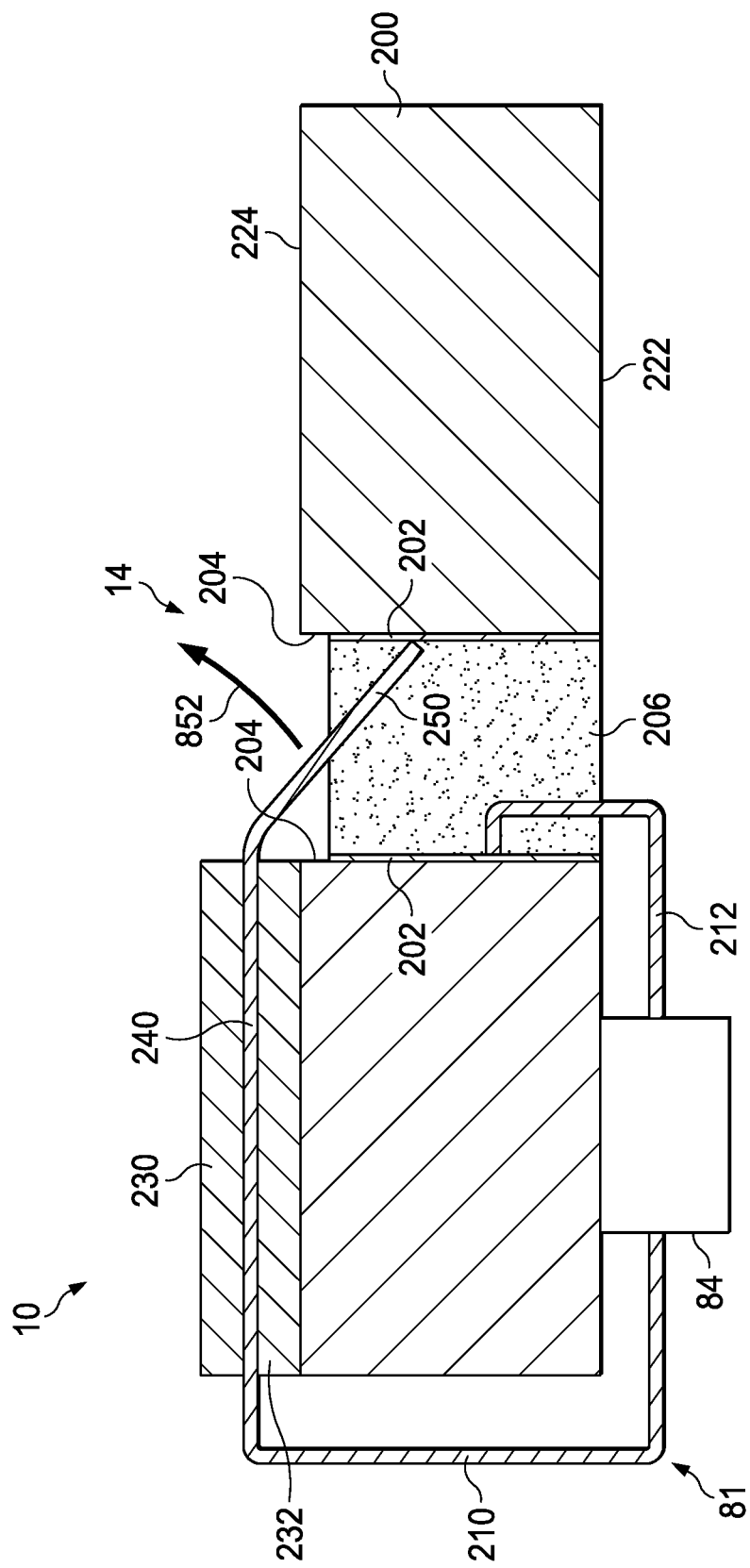
FIG. 3C is a diagram illustrating the temperature indicator of FIGS. 3A and 3B in accordance with the present disclosure in an activated state.

FIG. 3A is a diagram illustrating an embodiment of indicator 10 in accordance with the present disclosure in an unarmed state and prior to activation (e.g., prior to detecting a particular temperature or time-temperature event and before it has been armed in the field). FIG. 3B is a diagram illustrating an embodiment of indicator 10 in accordance with the present disclosure after indicator 10 has been armed by removing arming element 79 but before indicator 10 has been activated by a temperature event. FIG. 3C is a diagram illustrating an embodiment of indicator 10 after it has been both armed and activated (e.g., after detecting a particular temperature or time-temperature event). In the embodiment illustrated in FIGS. 3A and 3B, switch circuitry 81 is in an open circuit state until indicator 10 has been exposed to a temperature exceeding a threshold In the illustrated embodiment, detection assembly 14 includes a support member 200. In some embodiments, support member 200 is a printed circuit board (PCB) having a via 204 formed with a conductive interior contact surface 202. For example, in the illustrated embodiment, via 204 extends through member 200 and is coated with a conductive material on the interior wall surface 202 thereof. In at least one embodiment, detection assembly 14 includes a non-conductive malleable substance 206 contained in via 204 (filled completely or partially). Substance 206 is configured to soften in response to being subjected to a temperature exceeding a particular threshold. In the illustrated embodiment, RFID module 84 is coupled to member 200. However, it should be understood that RFID module 84 may be otherwise located.

In the embodiment illustrated in FIGS. 3A-3C, switch circuitry 81 includes switch elements 210 and 212. Switch element 212 is coupled to RFID module 84 and contact 202 (e.g., one end of element 212 is coupled to RFID module 84 and another end of switch element 212 is coupled to and/or in engagement with contact 202 in via 204). In the illustrated embodiment, the end of switch element 212 coupled to contact surface 202 is disposed within via 204; however, it should be understood that switch element 212 may be disposed in contact with contact surface 202 without switch element 212 entering via 204 (e.g., having a portion of contact 202 extending onto a surface 222 of support member 200 where switch element 212 may be in engagement therewith). Switch elements 210 and 212 and contact 202 may comprise electrically conductive wires, traces, pads, posts, coatings and/or other type of electronic conductive components.

Switch element 210 is also coupled to RFID module 84. In the embodiment illustrated in FIG. 3A (e.g., an unarmed and unactivated state of indicator 10), element 210 extends around support 200 and extends into via 204. In the illustrated embodiment, switch element 212 engages contact 202 from the side or surface 222 of member 200. On an opposite side or surface 224 of member 200 (e.g., opposite side 222) are holding members 230 and 232. Holding members 230 and 232 may be tape strips, mounted PCB elements, straps, fasteners, or any other suitable material to retain a portion of switch element 210 adjacent and/or near side 224 of member 200. As illustrated in FIG. 3A, switch elements 210 and 212 enter via 204 from opposite sides 224 and 222, respectively, of member 200 such that a portion 240 of switch element 210 is being held by members 230 and 232 adjacent to member 200. However, it should be understood that the connection of switch element 210 with RFID module 84 may be otherwise configured.

As shown in FIG. 3A, a distal end 250 of switch element 210 is inserted into via 204 and into malleable substance 206. Distal end 250 is configured in a biased state during placement into via 204 (e.g. mechanical memory or stiffness). For example, in the embodiment depicted in FIG. 3A, distal end 250 is placed into a biased position and maintained in the biased position by malleable substance 206 such that distal end 250, absent an intervening force or blocking element (e.g., malleable substance 206), would move in a counter clockwise direction (shown by arrow 852 in FIG. 3A) toward contact surface 202. Thus, in the biased state or position of end 250, end 250 is disposed spaced apart from contact surface 202. Additionally, in the embodiment illustrated in FIG. 3A, arming element 79 is disposed between distal end 250 of switch element 210 and contact surface 202. Thus, in the unarmed state of indicator 10, even if indicator 10 is subjected to a temperature exceeding a threshold that would otherwise cause malleable substance 206 to soften and thereby enable end 250 to move in direction 852, distal end 250 is prevented from contacting contact surface 202 by arming element 79.

In the embodiment illustrated in FIG. 3B, indicator 10 has been placed into an armed state based on the removal of arming element 79 (e.g., arming element 79 has been removed and is no longer visible in FIG. 3B). In the embodiment shown in FIG. 3B, indicator 10 has not been activated because it has not yet been exposed to a particular temperature threshold after having been armed. In the illustrated embodiment, malleable substance 206 maintains distal end 250 in a biased position (i.e., spaced apart from surface contact 202) prior to a specific temperature threshold being experienced by indicator 10 for some minimum period of time (i.e., a time/temperature threshold). Until this time/temperature threshold has been reached, malleable substance 206 remains rigid enough to prevent distal end 250 from contacting the contact surface 202 despite arming element 79 having been removed during field arming of indicator 10. It should be noted that in at least one embodiment, substance 206 becomes more malleable at a higher temperature but remains viscous enough that substance 206 substantially remains in via 204 (i.e., not exiting, at least not entirely, via 204). An example of a compound usable as malleable substance 206 is a non-conductive wax.

Thus, in operation, in an armed but unactivated state (e.g., prior to a time-temperature parameter that would cause malleable substance 206 to soften), switch circuitry 81 is in a open circuit state or condition because switch element 210 is not in contact with contact surface 202 since malleable substance 206 remains hard or rigid enough to prevent distal end 250 of switch element 210 from contacting contact surface 202. In this state, when queried, RFID module 84 transmits value 94 indicating an open circuit condition, thereby indicating that indicator 10 has yet to be exposed to a time-temperature parameter that would otherwise activate indicator 10.

FIG. 3C illustrates an embodiment of indicator 10 in an activated state after indicator 10 has been subjected to a particular time-temperature parameter. The time-temperature parameter causes substance 206 to become more malleable and the bias (i.e. mechanical memory or stiffness) of distal end 250 causes distal end 250 to move through substance 206 in the direction 852 toward contact surface 202. For example, as substance 206 is exposed to an elevated temperature and becomes more malleable/softer, distal end 250 moves in the directed 250 and comes into contact with contact surface 202. Additionally, the above-described process is irreversible since the mechanical memory of distal end 250 will keep distal end 250 in contact with contact surface 202 even if substance 206 cools down and becomes more rigid at a later time. The activation of indicator 10 resulting from distal end 250 contacting surface contact 202 causes circuitry 81 to change from an open circuit state to a closed circuit state. In the closed circuit state, when queried (e.g., by reader 100), RFID module 84 transmits value 92 indicating a closed circuit condition, thereby indicating that indicator 10 has been exposed to a time-temperature parameter that activated indicator 10. Thus, embodiments of the present invention provide a non-reversible time-temperature indicator 10.

In the embodiment illustrated in FIGS. 3A-3C, switch circuitry 81 is configured in an open circuit state or condition in an unactivated state of indicator 10 and changes to a closed circuit state or condition after activation of indicator 10 due to indicator 10 experiencing a particular time/temperature threshold. However, it should be understood that indicator 10 may be otherwise configured (e.g., changing from a closed circuit state or condition in an unactivated state of indicator 10 to an open circuit state or condition after activation of indicator 10). For example, in some embodiments, distal end 250 may be biased into contact with contact surface 200 (or biased into contact with a portion of switch element 212) in an unactivated state and held in that position by malleable substance 206. Thus, in this embodiment, in response to substance 206 being exposed to an elevated temperature and becoming more malleable/softer, distal end 250 would become disengaged from contact surface 200 (or a portion of switch element 212), thereby causing switch circuitry to be in an open circuit state.

Thus, embodiments of the present disclosure enable temperature and/or time-temperature event detection using a temperature indicator having a small footprint using a temperature-sensitive assembly with a passive RFID tag that gives a different reading depending upon the status of the temperature switch circuitry. Because the RFID tag is passive, the temperature indicator does not need a battery or other external power source. Further, the configuration of the temperature indictor enables the temperature indicator to be irreversible once activated (or subjected to a sufficient magnitude and/or time of temperature event). Additionally, the temperature indicator of the present disclosure may be configured to be coupled with or in addition to a visual indicator 20 to provide a redundant or additional visual indication of activation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A temperature indicator, comprising:
a housing having a temperature detection assembly including a malleable substance;
switch circuitry having at least a portion thereof disposed within the malleable substance; and
a radio-frequency identification (RFID) module coupled to the switch circuitry; and
wherein responsive to the temperature detection assembly being subjected to a temperature exceeding a threshold, the malleable substance softens enabling the portion to move through the malleable substance relative to a conductive element that causes a change in a value output by the RFID module when activated based on the portion either contacting the conductive element or disengaging from the conductive element.

2. The temperature indicator of claim 1, wherein the malleable substance comprises a non-conductive malleable substance.

3. The temperature indicator of claim 1, wherein the temperature detection assembly includes a support member containing the malleable substance, and wherein the portion includes a switch element having at least a portion thereof disposed within the malleable substance.

4. The temperature indicator of claim 1, wherein the switch circuitry is configured to be in a state of either a closed circuit or an open circuit, and responsive to the temperature detection assembly being subjected to the temperature exceeding the threshold, a change to the state occurs.

5. The temperature indicator of claim 1, wherein the temperature detection assembly includes:
a support member containing a via formed with the conductive element being a conductive surface; and
the malleable substance disposed within the via; and
wherein the portion includes a switch element disposed within the malleable substance and spaced apart from the conductive surface, and wherein responsive to the temperature detection assembly being subjected to the temperature exceeding the threshold, the switch element moves into contact with the conductive surface.

6. The temperature indicator of claim 1, wherein the RFID module comprises a passive RFID module.

7. The temperature indicator of claim 1, wherein the portion includes a switch element disposed within the malleable substance and biased toward the conductive element, wherein the conductive element is coupled to the RFID module, the malleable substance maintaining the switch element spaced apart from the conductive element in an unactivated state, and wherein responsive to the temperature detection assembly being subjected to the temperature exceeding the threshold, the switch element overcomes a resistance of the malleable substance and moves into contact with the conductive element.

8. A temperature indicator, comprising:
a housing having a support member containing a non-conductive malleable substance;
a communication module; and
switch circuitry including a switch element having at least a portion thereof disposed within the malleable substance and spaced apart from a conductive element, and wherein responsive to the temperature indicator being subjected to a temperature exceeding a threshold, the portion moves within the malleable substance and into contact with the conductive element, and wherein the communication module is configured to indicate an activated state of the temperature indicator in response to the portion contacting the conductive element.

9. The temperature indicator of claim 8, wherein the communication module includes a passive radio-frequency identification (RFID) module.

10. The temperature indicator of claim 8, wherein the portion is biased toward the conductive element.

11. The temperature indicator of claim 8, wherein the malleable substance softens in response to the temperature indicator being subjected to the temperature exceeding the threshold, the softening enabling the portion to move through the malleable substance and into contact with the conductive element.

12. The temperature indicator of claim 8, wherein the switch circuitry is configured to change from an open circuit to a closed circuit in response to the portion contacting the conductive element.

13. A temperature indicator, comprising:
a housing having a temperature detection assembly including a malleable substance;
an arming element disposed at least partially within the malleable substance and configured to maintain the temperature detection assembly in an unarmed state;
switch circuitry including a switch element at least partially disposed within the malleable substance; and
a radio-frequency identification (RFID) module coupled to the switch circuitry; and
wherein removal of the arming element from the temperature indicator places the temperature detection assembly in an armed state, and where responsive to the temperature detection assembly being subjected to a temperature exceeding a threshold after being in the armed state, the malleable substance softens enabling the switch element to move through the malleable substance relative to a conductive element that causes a change in a value output by the RFID module when activated based on the switch element either contacting the conductive element or disengaging from the conductive element.

14. The temperature indicator of claim 13, wherein the switch element is biased toward the conductive element.

15. The temperature indicator of claim 13, wherein the arming element is disposed between the switch element and the conductive element in the unarmed state.

16. The temperature indicator of claim 13, wherein the temperature detection assembly includes:
a support member containing a via formed with the conductive element being a conductive surface; and
the malleable substance disposed within the via; and
wherein the switch element is disposed spaced apart from the conductive surface, and wherein responsive to the temperature detection assembly being subjected to the temperature exceeding the threshold, the switch element moves into contact with the conductive surface.

17. The temperature indicator of claim 13, wherein the RFID module comprises a passive RFID module.

18. The temperature indicator of claim 13, wherein the malleable substance comprises a non-conductive malleable substance.

19. The temperature indicator of claim 13, wherein the switch circuitry is configured to be in a state of either a closed circuit or an open circuit, and responsive to the temperature detection assembly being subjected to the temperature exceeding the threshold, a change to the state occurs.

20. The temperature indicator of claim 13, wherein the switch element is biased toward the conductive element, the malleable substance maintaining the switch element spaced apart from the conductive element in an armed and unactivated state, and wherein responsive to the temperature detection assembly being subjected to the temperature exceeding the threshold, the switch element overcomes a resistance of the malleable substance and moves into contact with the conductive element.

\* \* \* \* \*